US007007792B1

(12) United States Patent
Burch

(10) Patent No.: US 7,007,792 B1
(45) Date of Patent: Mar. 7, 2006

(54) ANGLED-ROLLER ARTICLE-ROTATING BELT CONVEYOR

(75) Inventor: Ronald H. Burch, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 10/906,832

(22) Filed: Mar. 8, 2005

(51) Int. Cl.
*B65G 47/26* (2006.01)

(52) U.S. Cl. ............. 198/457.02; 198/779; 198/370.03

(58) Field of Classification Search ........ 198/850–853, 198/597, 779, 457.02, 370.03, 370.09
See application file for complete search history.

(56) References Cited

U.S. PATENT DOCUMENTS

| | | | |
|---|---|---|---|
| 3,047,123 A | 7/1962 | McKay | 198/33 |
| 3,866,739 A | 2/1975 | Sikorski | 198/30 |
| 4,143,756 A * | 3/1979 | Chorlton | 198/457.02 |
| 4,676,361 A | 6/1987 | Heisler | 198/394 |
| 4,901,842 A | 2/1990 | Lemboke et al. | 198/415 |
| 5,191,962 A | 3/1993 | Wegscheider et al. | 198/415 |
| 5,400,896 A | 3/1995 | Loomer | 198/415 |
| 5,551,543 A | 9/1996 | Mattingly et al. | 198/370.09 |
| 5,660,262 A | 8/1997 | Landrum et al. | 198/411 |
| 5,769,204 A | 6/1998 | Okada et al. | 198/443 |
| 5,836,439 A | 11/1998 | Coyette | 198/415 |
| 5,924,548 A | 7/1999 | Francioni | 198/415 |
| 6,073,747 A | 6/2000 | Takino et al. | 198/370.09 |
| 6,401,936 B1 | 6/2002 | Isaacs et al. | 209/656 |
| 6,494,312 B1 | 12/2002 | Costanzo | 198/779 |
| 6,571,937 B1 | 6/2003 | Costanzo et al. | 198/779 |
| 6,758,323 B1 * | 7/2004 | Costanzo | 198/457.02 |

* cited by examiner

*Primary Examiner*—James R. Bidwell
(74) *Attorney, Agent, or Firm*—James T. Cronvich

(57) ABSTRACT

A conveyor system including a pair of roller-top belts arranged side by side, each individually controllable to cause articles conveyed atop both to rotate into preferred orientations. The roller-top belts include rollers that rotate about axes oblique to the direction of belt travel. The rollers on each belt direct conveyed articles toward the other belt as the belts advance in the direction of belt travel and the rollers contact an underlying bearing surface in rolling contact. The rotation of the rollers exerts a force on articles conveyed atop the rollers. The force has a component directed toward the other belt and another component directed downstream. A sensor array senses the footprint of an article at an upstream location and sends signals to a controller that determines the size and orientation of the article to selectively stop one or the other roller-top belt if necessary to rotate the article to change its orientation.

35 Claims, 6 Drawing Sheets

ANGLED-ROLLER ARTICLE-ROTATING BELT CONVEYOR

DESCRIPTION

Background

This invention relates generally to power-driven conveyors and, more particularly, to conveyors capable of rotating conveyed articles by selectively stopping one or the other of a pair of side-by-side roller-top belts, each having rollers arranged to direct articles obliquely toward the other.

Many conveying applications require that conveyed articles of a variety of shapes and sizes be aligned single file in a specific orientation for downstream processing or inspection. Sometimes the width of the conveyor or of the entrance into a processing station is limited. In the case of articles having a generally rectangular footprint, with a minor axis and a longer major axis, the major axis or the diagonal can exceed the dimensions of a limited-width portion of the conveyor. If the major axis of an oversized article is oriented on the conveyor with its long axis across the width of the conveyor, the article can jam between the side walls of the conveyor. Manual intervention is then required to free the jam. Consequently, there is a need for a conveyor that can align and orient articles of a variety of sizes and shapes to prevent them from jamming on width-restricted conveyor sections.

SUMMARY

This need and other needs are satisfied by a conveyor embodying features of the invention. In one aspect, the conveyor comprises first and second conveyor belts in the form of belt loops arranged parallel to each other. Each belt extends in width from a first side to a second side and in thickness from an outer surface to an inner surface. The first side of the first belt is adjacent to the second side of the second belt. A portion of the parallel loops defines a carryway along which articles are conveyed atop the outer surfaces of the belts from an upstream end to a downstream end of the carryway. A first drive engages the first belt to advance it along the carryway in a direction of belt travel. A second drive similarly engages the second belt. Each belt includes rollers protruding beyond its outer and inner surfaces. At least one bearing surface underlies the two belts along a portion of the carryway. The rollers protrude beyond the inner surfaces of the belts into rolling contact with the bearing surface. As the belts advance in the direction of belt travel, the rolling contact causes the rollers to rotate. The rollers in the first belt are arranged to rotate about first axes oblique to the direction of belt travel. In this way, rollers exert a first force to articles conveyed atop the rollers directed to urge the articles downstream and toward the second belt. The rollers in the second belt rotate about second axes to exert a second force to direct conveyed articles downstream and toward the first conveyor belt. A controller is coupled to one or both of the drives to selectively stop either of the belts while the other continues to advance.

Another version of a conveyor embodying features of the invention comprises a carryway including first and second roller-top conveyor belts side by side between upstream and downstream ends of the carryway. Articles are conveyed atop rollers in the two belts. A bearing surface lies under the roller-top belts along a portion of the carryway. The rollers in the belts have salient portions that support conveyed articles along carryway and that engage the bearing surface in rolling contact as the belts advance along the carryway in a direction of belt travel. The rollers in the first conveyor belt are arranged to rotate about first axes oriented to urge conveyed articles toward the second conveyor belt as the first conveyor belt advances ant the rollers roll in contact with the bearing surface. Similarly, the rollers in the second belt are arranged to rotate about second axes oriented to urge conveyed articles toward the first conveyor belt. First and second drives are coupled to the first and second belts to selectively stop the advance of either of the belts as the other continues to advance.

Another version of article-rotating conveyor comprises a conveyor arrangement that extends from an upstream end to a downstream end and includes a pair of individually driven conveyor belts positioned side by side across a gap. Each conveyor belt includes rollers, each of which has a salient portion extending past top and bottom belt surfaces. Each roller is rotatable on an axis that intersects the gap at a position upstream of the roller. The conveyor arrangement defines a carryway along which articles are conveyed atop the rollers as the belts advance from the upstream end to a downstream end. The carryway has an active portion underlain by a bearing surface that contacts the rollers, which extend past the bottom belt surfaces. This contact causes the rollers to rotate as the conveyor belts advance. The carryway also includes an inactive portion in which the rollers do not contact the bearing surface. A controller coupled to the conveyor arrangement selectively stops the advance of one or the other of the pair of conveyor belts when a conveyed article is in the active portion of the carryway. Stopping one of the belts while the other continues to advance causes the conveyed article to rotate.

Yet another version of a conveyor embodying features of the invention comprises first and second individually driven conveyor belts forming belt loops. Each belt extends in width from a first side to a second side and in thickness from an outer surface to an inner surface. The belts are disposed parallel to each other. The first side of the first belt is adjacent to the second side of the second belt. A portion of the loops defines a carryway along which articles are conveyed along the outer surfaces from an upstream to an opposite downstream end. The belts include rollers protruding beyond the belts' outer and inner surfaces. A bearing surface underlies the belts along at least a portion of the carryway. The rollers extend from the inner surface of the belt into rolling contact with the bearing surface. The rolling contact causes the rollers to rotate as the belts advance in a direction of belt travel. Each of the rollers in the first belt is arranged to rotate about an axis that intersects the first side of the first belt at a position upstream of the roller. Each of the rollers in the second belt is arranged to rotate about an axis that intersects the second side of the second belt at a position upstream of the roller. A controller coupled to one or both of the belts selectively stops either one of the belts while the other continues to advance.

Still another version of conveyor comprises a first roller-top belt arranged to be driven in a direction of belt travel along the carryway. A second roller-top belt is arranged side by side with the first roller-top belt along the carryway. A bearing surface lies under the belts along at least a portion of the carryway. Each of the belts includes rollers that contact the bearing surface in the carryway. As the belts are driven in the direction of belt travel, the contact between the bearing surface and the rollers causes the rollers to rotate. The rollers on each belt are arranged to exert on conveyed articles forces having components directed toward the other belt as the rollers rotate. A drive system is coupled to the belts to selectively stop one of the belts while the other continues to advance for a sufficient time to rotate an article being conveyed atop the belts.

In another aspect, a method embodying features of the invention comprises selecting a first conveyor belt that extends in width from a first side to a second side and that has rollers protruding past outer and inner surfaces of the belt and arranged to rotate on first axes that form acute angles measured counterclockwise from the first side of the belt. The method further comprises selecting a second conveyor belt that extends in width from a first side to a second side and whose rollers are arranged to rotate on second axes that form acute angles measured clockwise from the second side of the belt. According to the method, the belts are arranged side by side with a first side of the first belt adjacent to the second side of the second belt. The method further comprises supporting a portion of the first and second conveyor belts atop an underlying bearing surface that contacts the rollers protruding past the bottom surface of the belts to rotate the rollers as the belts advance. The method further comprises advancing the belts in a direction of belt travel and putting an article atop the rollers protruding past the outer surfaces of the belts. The method finally includes stopping one of the belts from advancing in order to rotate the article atop the rollers as the other belt continues to advance.

BRIEF DESCRIPTION OF THE DRAWINGS

These features and aspects of the invention, as well as its advantages, are better understood by referring to the following description, appended claims, and accompanying headings, in which:

DETAILED DESCRIPTION

Figure 1:
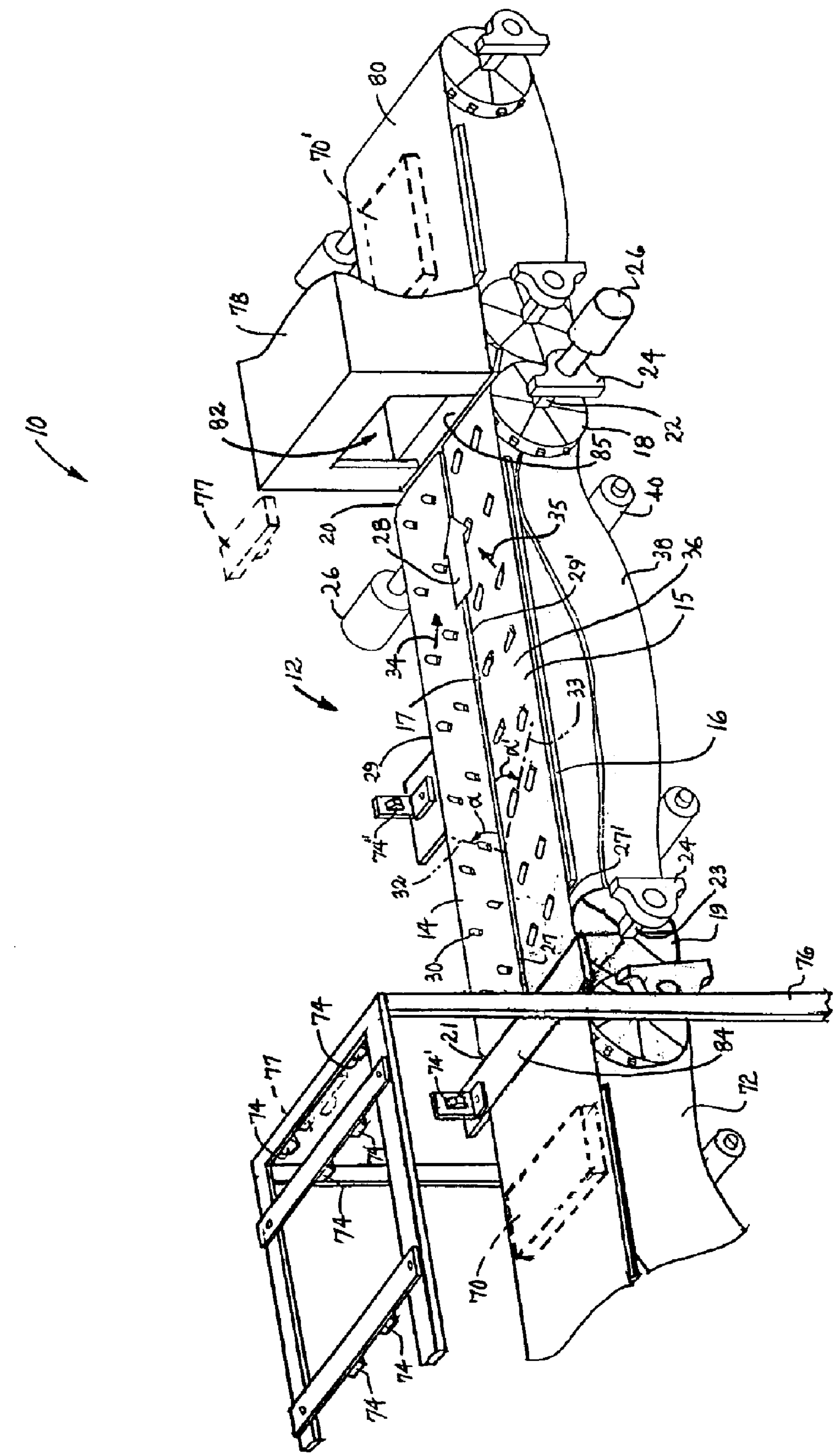
FIG. 1 is a pictorial view of a conveyor embodying features of the invention.

A conveyor system embodying features of the invention is shown in FIG. 1. The conveyor 10 includes an article-rotating conveyor 12 that is constructed of first and second roller-top conveyor belts 14, 15 arranged side by side across a narrow gap 17. The belts are supported in a conveyor frame 16 (shown only partly for drawing clarity). Each belt extends in width from a first side 27, 27', to a second side 29, 29', with the first side of the first belt adjacent to the second side of the second belt. Each roller-top belt is trained about drive and idler sprockets 18, 19 at downstream and upstream ends 20, 21 of the conveyor. The drive sprockets are mounted on a drive shaft 22 supported at each end in bearing blocks 24. The drive shaft is coupled to a motor 26, which rotates the shaft and sprockets to drive the belt in a direction of belt travel, or conveyance direction 28. The idler sprockets at the upstream end are mounted on an idler shaft 23 supported at each end for rotation by bearing blocks 24. The bearing blocks are mounted to the conveyor frame. Each roller-top conveyor belt has its own drive shaft and idler shaft so that the belts can be driven at different speeds or individually stopped. The belts convey articles from the upstream end to the downstream end along an upper carryway 36. The belt makes its return along a lower returnway 38 supported by shoes, drums, or rollers 40 to reduce sag.

Figure 2:
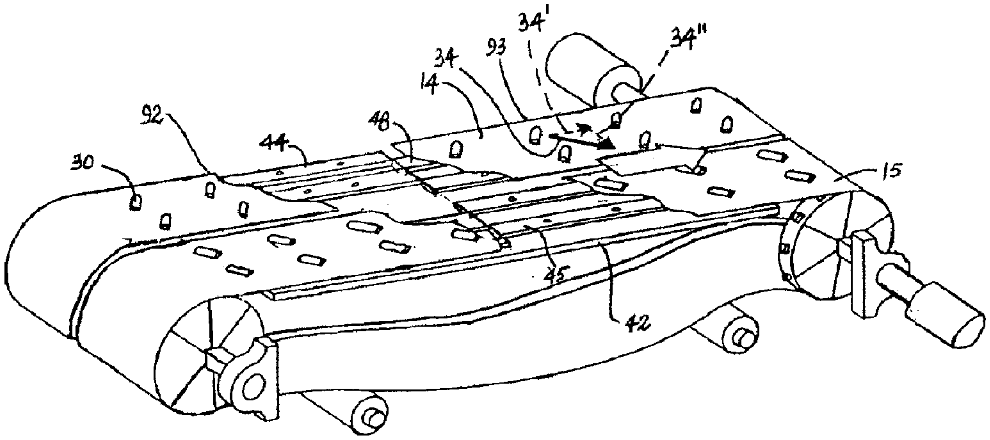
FIG. 2 is a partly cutaway view of the roller-top belt portion of the conveyor of FIG. 1.

Each belt is characterized by a plurality of rollers 30 arranged to rotate on oblique axes 32, 33 that form acute angles $\alpha$, $\alpha'$ with respect to the direction of belt travel. The axes intersect the gap between the belts at positions upstream of the rollers. Preferably, the angles are mirror images of each other about the gap separating the two side-by-side belts. The angles may be 45° or 60°, for example. Rotation of the rollers pushes conveyed articles toward the gap. The directions of the forces exerted by the rotating rollers on articles atop them are indicated by arrows 34, 35. As shown in FIG. 2, the force 34 exerted by each roller in the first belt 14 includes a first downstream component 34' and a second component 34" directed toward the second belt 15. The forces exerted by the rotating rollers in the second belt are directed downstream and toward the first belt. The belts are supported along the carryway 36 in a pan 42 supported in the conveyor frame. Wearstrips, 44, 45 mounted to the pan underlie the belts. The upstream wearstrips 44 in an upstream portion 92 of the carryway are arranged to underlie the belts along longitudinal lanes devoid of rollers 30. The downstream wearstrips 45 in a downstream portion 93 of the carryway are laterally offset from the upstream wearstrips to underlie the belts in longitudinal lanes that include the rollers. In this way, the rollers in the inactive upstream portion of the carryway are passive and free to rotate under the influence of conveyed articles. In the active downstream portion, the rollers, which are in direct contact with a top bearing surface 48 on the wearstrips 45, are driven to rotate as the belt advances in the direction of belt travel. When a belt is stopped, its rollers are somewhat hindered from rotating by their contact with the wearstrips. The active portion may alternatively be located at the upstream portion, which allows a conveyed article to rotate earlier so that a trailing article can enter the active upstream portion while the already rotated article proceeds along the inactive downstream portion. This results in greater throughput.

Figure 4:
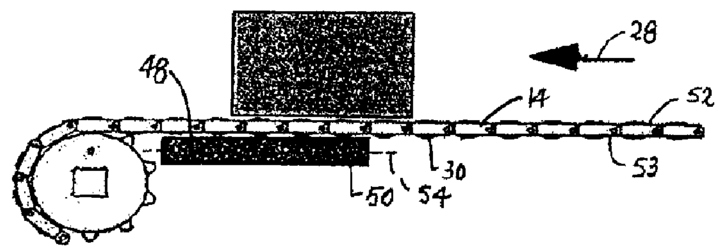
FIG. 4 is a side elevation view of a portion of the belt of FIG. 2.

The bearing surfaces 48 can be provided by the peripheries of cylindrical rollers 50 in the downstream portion of the carryway, as shown in FIG. 4. Each cylindrical roller is arranged to underlie a longitudinal lane of belt rollers 30. Salient portions of the belt rollers protrude beyond outer and inner belt surfaces 52, 53 and into contact with the periphery of the cylindrical roller, which is free to rotate about a longitudinal axis 54. The interaction between the obliquely arranged belt rollers and the cylindrical roller results in more rolling and less sliding than the interaction between the belt rollers and a flat, static wearstrip. These represent just two ways of providing bearing surfaces to underlie the rollers along at least a portion of the carryway.

Figure 3A:
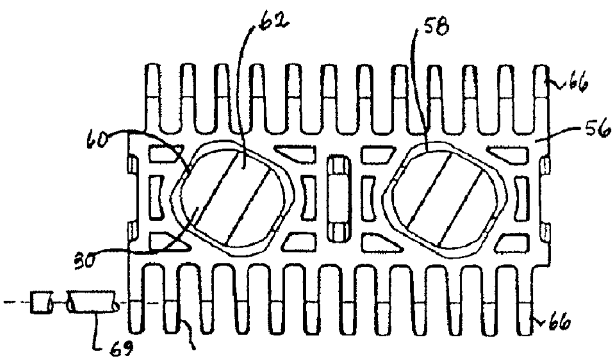
FIGS. 3A, 3B, and 3C are top plan, side, and front elevation views of a conveyor belt module usable in a roller-top belt as in FIG. 2.
Figure 3B:
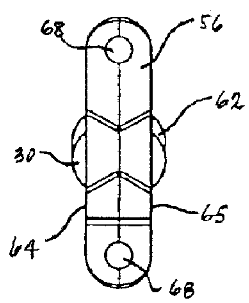
Figure 3C:
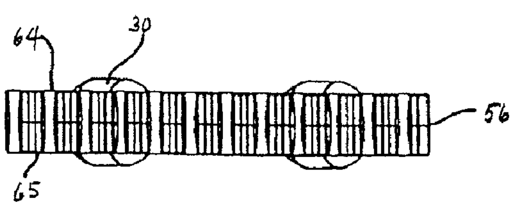

Although the roller-top belts 14, 15 could be constructed as flat belts with oblique rollers, the belts are preferably modular plastic conveyor belts constructed of individual rows of belt modules, such as the internal belt modules 56 shown in FIGS. 3A–3C. The module is preferably molded of a thermoplastic polymer, such as polypropylene, polyethylene, acetal, or a composite material, in an injection-molding process. A molded plastic roller 30 with a central bore is rotatably mounted in a cavity 58 on an axle 60 extending through the walls of the cavity and retained in the module body. The roller may also include an elastomeric outer surface or an elastomeric outer band 62 to provide high-friction contact with the underlying bearing surfaces and with conveyed articles. Salient portions of the rollers protrude through the thickness of the module past top and bottom surfaces 64, 65, which form the outer and inner surfaces of the belt they compose. Hinge elements 66 along each end of the module have aligned openings 68 formed through them. A belt is constructed by forming rows of one or more belt modules. The hinge elements at the leading end of each row are interleaved with the hinge elements along the trailing end of an adjacent row. A hinge pin 69 is received in the lateral passageway formed by the aligned openings in the interleaved hinge elements. The hinge pins connect the rows together and allow the belt to articulate. Preferably, the modules are arranged in a bricklay pattern for strength. A suitable belt is the Series 400 Angled Roller™ belt manufactured and sold by Intralox, L.L.C., of Harahan, La., USA.

The roller-top conveyor 12, as shown in FIG. 1, is fed articles 70, such as baggage, from an infeed conveyor 72, which may be a belt conveyor. An array of photoelectric sensors 74 is mounted above the infeed conveyor carryway in a framework 76. The sensors, such as the Allen-Bradley® Model 42BC Photoelectric Sensors, sold by Rockwell Automation, Inc. of Milwaukee, Wis., USA, are used to determine the general orientation and size of each conveyed article. Additional photoelectric sensors 74', 74" mounted at positions along the side of the article-rotating conveyor 12 are used to sense the presence of a conveyed article at those positions along the conveyor. Other types of sensors, such as digital cameras and laser distance sensors, could be used exclusively or in combination to similar effect. Cameras 77, for example, could be positioned above the infeed conveyor and the active portion of the carryway. A processing station 78 is shown downstream of the roller-to conveyor. A conveyor 80 in the processing station receives articles from the roller-top conveyor through a restricted opening 82. Nose bar transfer plates 84, 85 may optionally be used between conveyors to bridge the spacing between ends of consecutive conveyors. The roller-top conveyor is operated to rotate a conveyed article from its upstream orientation 70 to a downstream orientation 70' as necessary for the article to pass through the restriction.

Figure 5:
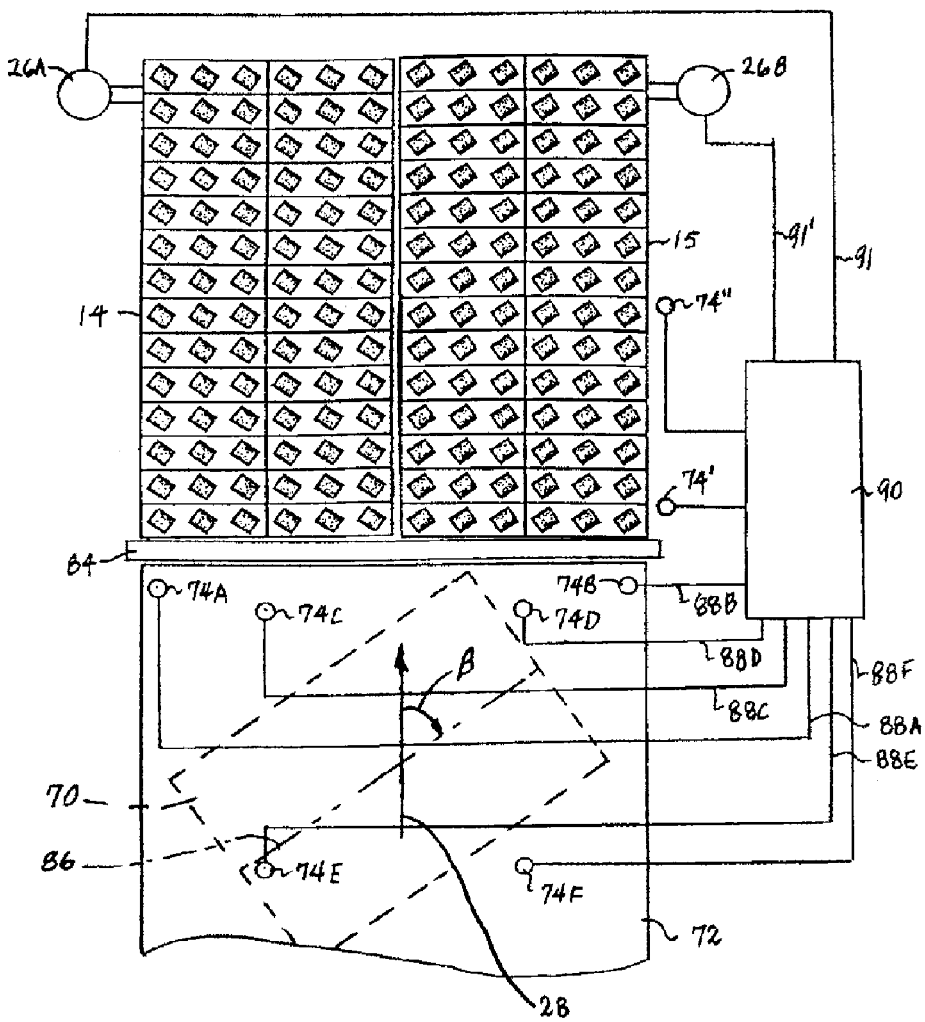
FIG. 5 is a mechanical/electrical block diagram of a conveyor as in FIG. 1.

FIG. 5 shows a plan of the conveyor in conjunction with a block diagram of the control. The two roller-top belts 14, 15 are shown side by side from above. Six photoelectric sensors 74A–F are shown in one possible arrangement for detecting the general size and orientation of a conveyed article 70. More particularly, the sensors may be used to determine the length of the major axis 86 of the article and its angle β relative to the direction of belt travel 28. Each sensor sends a signal over signal lines 88A–F to a controller 90. In the case of photoelectric sensors, the signal indicates the presence or absence of a conveyed article at a focal distance below the sensor. The focal distance is set at a few inches above the infeed conveyor 72. A conveyed article above the conveyor reflects the beam back to the photoelectric sensor to indicate its presence at that point. From the six signals, the controller can determine, for example, the length of the major axis and its angle β. A synchronizing photoelectric sensor 74' positioned at a side of the conveyor system just downstream of the array sends a signal to the controller indicating that a conveyed article is in position to be sensed by the array. Depending on the size and orientation of the article, the controller controls one of the motors 26A, 26B over control lines 91, 91' to stop one of the roller-top belts 14, 15 while the other continues to advance. A marking photoelectric sensor 74" sends the controller a signal that marks the entrance of the conveyed article into the downstream controlled portion of the conveyor. After receiving this signal, the controller initiates rotation of the article, if necessary. The continued motion of one belt and the stopped motion of the other cause the conveyed article to rotate into an orientation that the restricted opening downstream accommodates. By selectively controlling the drive system, which includes the individual drives (motor, shaft, sprockets) for each roller-top belt, the controller can cause the conveyor to rotate articles clockwise or counterclockwise by stopping one or the other roller-top belt or to allow the articles to pass through without rotation by driving both belts without stopping. The belts are stopped for a predetermined time to effect sufficient rotation. The predetermined time is empirically determined. To increase throughput, the unstopped belt may alternatively be sped up to run faster, such as 50% or 100% faster than its regular speed. This speed-up while the other belt is stopped causes conveyed articles to rotate in less time. A more sophisticated, closed-loop sensing scheme using, for example, cameras sending signals to the controller could be used to restart a belt as soon as the cameras detect that sufficient rotation is achieved.

Figure 6A:
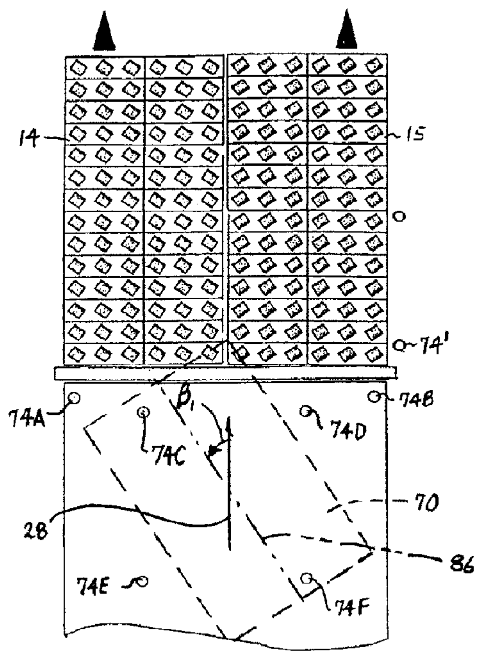
FIGS. 6A–6D are diagrams illustrating step by step the clockwise rotation of a conveyed article in a conveyor as in FIG. 1.
Figure 6B:
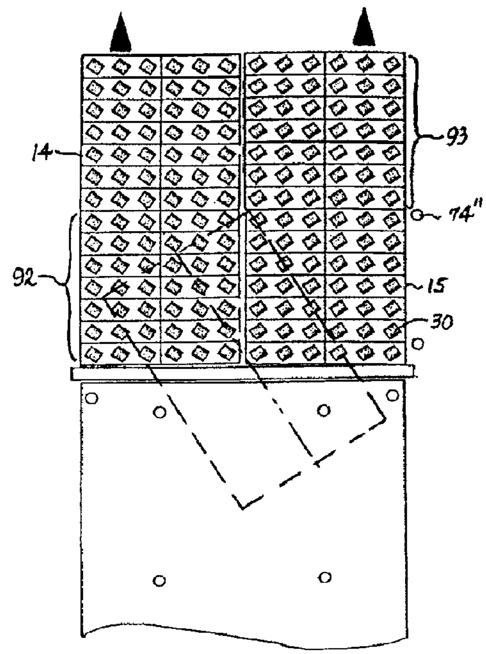
Figure 6C:
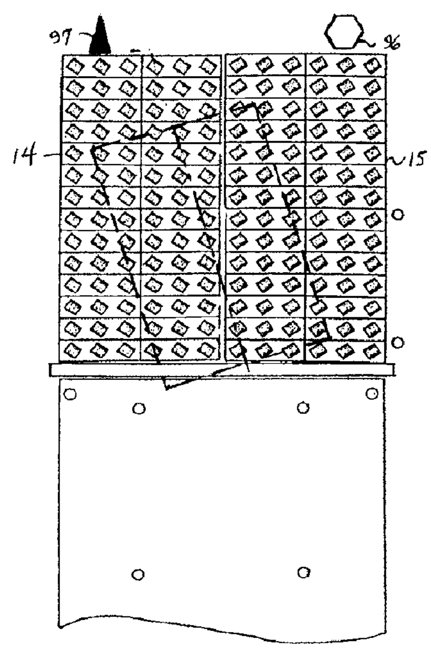
Figure 6D:
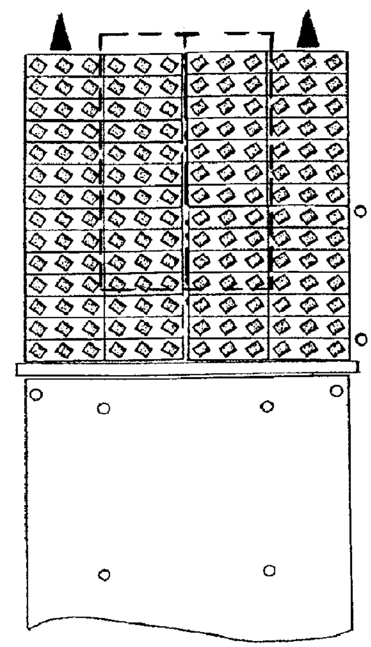
Figure 7A:
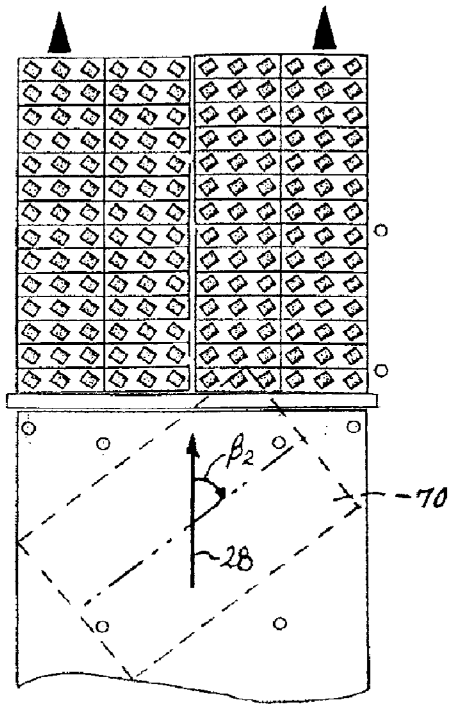
FIGS. 7A–7D are diagrams illustrating step by step the counterclockwise rotation of a conveyed article in a conveyor as in FIG. 1.
Figure 7B:
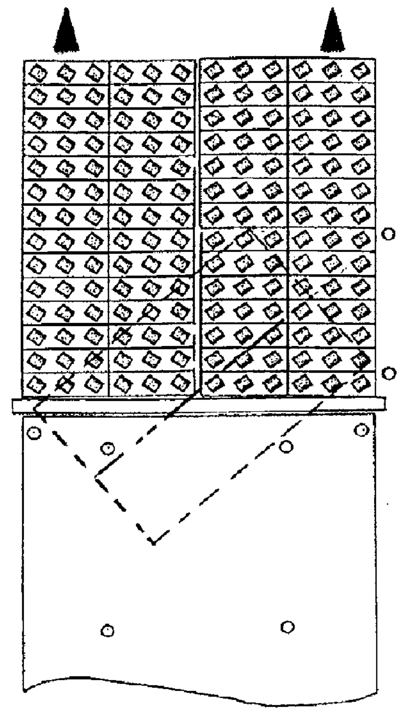
Figure 7C:
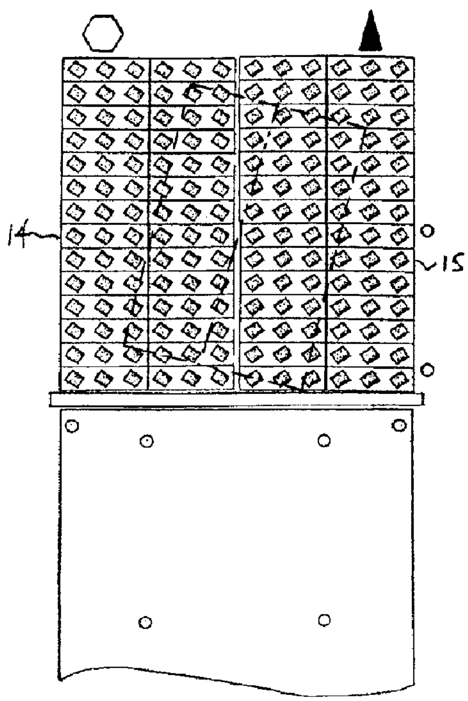
Figure 7D:
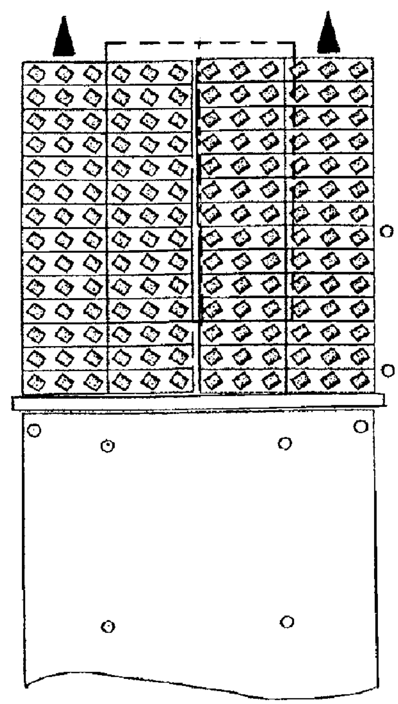

FIGS. 6A–6B illustrate step by step the operation of the conveyor in the presence of a conveyed article requiring clockwise rotation for proper orientation. In FIG. 6A, a conveyed article 70 is sensed by the sensor array 74A–D as soon as the article is detected by the synchronizing sensor 74'. From the array signals, the controller estimates the length of the article's major axis 86 and its orientation relative to the conveyance direction 28. In this example, the article's major axis lies at an acute angle $\beta_1$ measured counterclockwise from the direction of belt travel. In FIG. 6B, the article is received more fully on the roller-top conveyor belts 14, 15, which convey it along the upstream portion 92 of the carryway, in which the rollers 30 do not rotate by contact with underlying bearing surfaces. Until the article reaches the sensor 74" marking the downstream portion 93 of the carryway, in which the rollers contact underlying bearing surfaces, both belts are advancing together in the direction of belt travel. As it travels along the upstream portion, the article may rotate slightly on the disengaged rollers. The marking sensor 74" sends a signal to the controller indicating the article's entry into the downstream portion. Knowing the major axis of the article, in this example, to be rotated counterclockwise off the direction of belt travel by an amount sufficient to cause a jam at a downstream restriction, the controller stops (as indicated by hexagon 96) the second roller-top belt 15 as the first belt continues to advance (arrow 97). The rotation of the rollers on the first belt combined with the stopped roller in the second belt cause the article to rotate clockwise, in the downstream portion of the carryway, as shown in FIG. 6C. After a predetermined period of time, the second roller-top belt is once again commanded to run, as shown in FIG. 6D. By this time, the conveyed article is generally centered on the two belts with its major axis oriented generally in the direction of belt travel to fit through any downstream restriction in width.

Figure 8A:
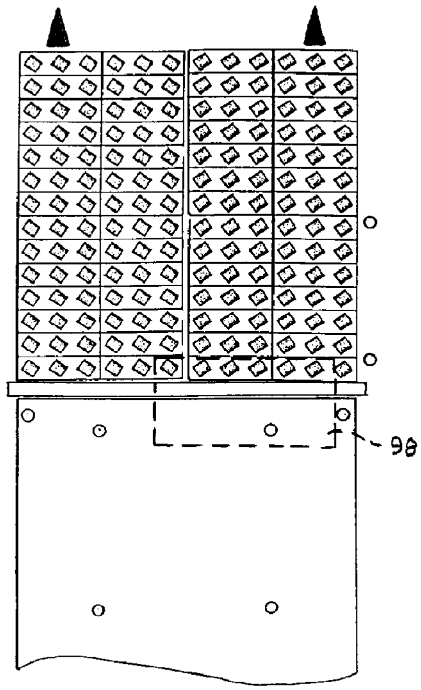
FIGS. 8A–8D are diagrams illustrating step by step the passage of a conveyed article not needing rotation through a conveyor as in FIG. 1, with FIG. 8C also showing an alternative sensor-array arrangement.
Figure 8B:
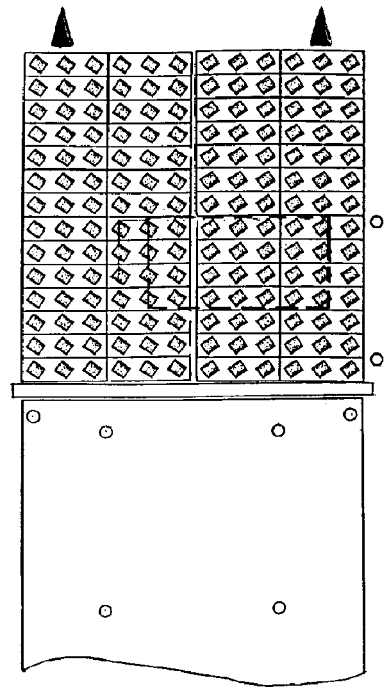
Figure 8C:
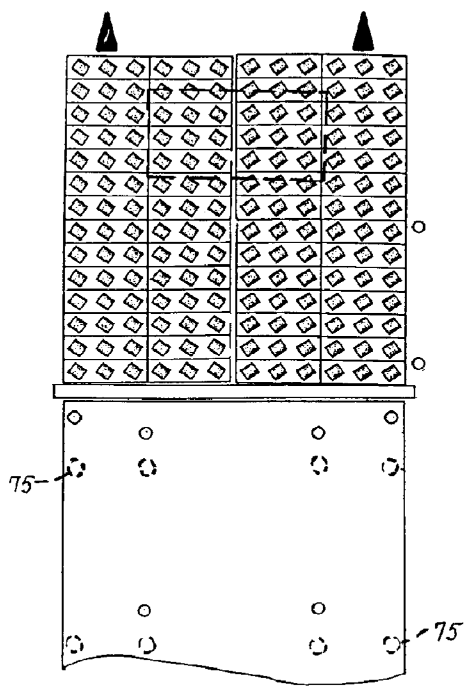
Figure 8D:
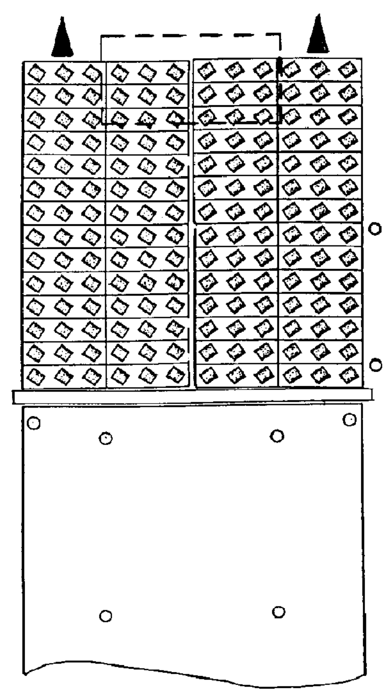

FIGS. 7A–7D illustrate the operation of the conveyor with a conveyed article whose major axis lies at an acute angle $\beta_2$ measured clockwise from the direction of belt travel. In this example, the controller stops the first belt 14 (FIG. 6C) as the second belt 15 continues to run. This causes the article to rotate counterclockwise to align its major axis generally in the direction of belt travel. FIGS. 8A–8D illustrate the advance of a small article 98, which does not have to be rotated because its major axis is small enough to clear the restriction. In FIG. 8A, the sensor array first detects that the article is small enough not to need reorientation. The article advances along the free rollers in the upstream portion of the roller-top conveyor in FIG. 8B. No stop command is sent by the controller to stop either belt. The belts continue to advance, as shown in FIG. 8C. The rollers, forced to roll along the underlying bearing surfaces in the downstream portion of the carryway, tend to center the article on the conveyor so that it exits as in FIG. 8D. Articles that may be big, but yet are oriented with their major axes generally in the direction of belt travel are similarly handled.

Thus, the invention has been described with respect to a preferred version, but other versions are possible. For example, to adapt to different article dimensions or restriction sizes, the array of photoelectric sensors could be arranged in different patterns, as represented by an alternative sensor array arrangement 75, shown in phantom in FIG. 8C. As a second example, the downstream conveyor section, in which bearing surfaces underlie the rollers, could extend upstream to include the entire carryway. It would also be possible to delete the marking sensor and use a fixed time delay after the synchronizing sensor's signal to command one or the other of the belts to stop. As another example, a sensor could be positioned near the exit from the conveyor to sense the presence of an article there and to restart a stopped belt in a closed-loop control system, rather than merely stopping one of the belts for a predetermined time in an open-loop system. So, as these few examples suggest, the scope of the claims is not meant to be limited to the details of the versions described.

What is claimed is:

1. A conveyor comprising:

first and second conveyor belts in the form of belt loops, each conveyor belt extending in width from a first side to a second side and in thickness from an outer surface to an inner surface, wherein the first and second conveyor belts are disposed parallel to each other with the first side of the first conveyor belt adjacent the second side of the second conveyor belt, a portion of the loops defining a carryway along which articles are conveyed along the outer surfaces from an upstream end of the carryway to an opposite downstream end;

a first drive engaging the first conveyor belt to advance the first conveyor belt along the carryway in a direction of belt travel from the upstream end to the downstream end;

a second drive engaging the second conveyor belt to advance the second conveyor belt along the carryway in the direction of belt travel;

wherein the first and second conveyor belts include a plurality of rollers protruding beyond the outer and inner surfaces of the first and second conveyor belts;

at least one bearing surface underlying the first and second conveyor belts along a portion of the carryway, the rollers protruding beyond the inner surfaces of the first and second conveyor belts into rolling contact with the bearing surface to rotate as the first and second conveyor belts advance in the direction of belt travel;

wherein the rollers in the first conveyor belt are arranged to rotate about first axes oblique to the direction of belt travel to exert a first force to articles conveyed atop the rollers in rolling contact with the bearing surface to urge the articles downstream and toward the second conveyor belt and wherein the rollers in the second conveyor belt are arranged to rotate about second axes oblique to the direction of belt travel to exert a second force to articles conveyed atop the rollers in rolling contact with the bearing surface to urge the articles downstream and toward the first conveyor belt;

a controller coupled to one or both of the first and second drives to selectively stop either of the first and second conveyor belts while the other conveyor belt continues to advance.

2. A conveyor as in claim 1 further comprising a first sensor disposed proximate the upstream end of conveyor and sending a first signal to the controller indicative of the orientation of an article conveyed along the carryway.

3. A conveyor as in claim 2 wherein the first sensor comprises an array of individual sensors each sending individual first signals to the controller.

4. A conveyor as in claim 2 wherein the controller is capable of stopping one or the other of the first and second conveyor belts in response to the first signal.

5. A conveyor as in claim 4 wherein the controller stops the first or second conveyor belt for a predetermined period of time.

6. A conveyor as in claim 4 wherein the controller is capable of speeding up one or the other of the first and second conveyor belts in response to the first signal.

7. A conveyor as in claim 2 further comprising a second sensor disposed at an upstream position along the carryway sending a second signal to the controller indicative of the presence of an article in position to be sensed by the first sensor.

8. A conveyor as in claim 2 further comprising a third sensor disposed along the carryway proximate the upstream end of the bearing surface to send a third signal to the controller indicative of the presence of a conveyed article at that position along the carryway and wherein the controller selectively sends a stop signal to one of the first and second drives after receipt of the third signal.

9. A conveyor as in claim 1 wherein the bearing surface underlies the first and second conveyor belts at the downstream end of the carryway.

10. A conveyor comprising:

a carryway including first and second roller-top conveyor belts disposed side by side between an upstream end and a downstream end of the carryway to convey articles atop rollers in the first and second roller-top conveyor belts;

a bearing surface underlying the first and second roller-top conveyor belts along a portion of the carryway;

the rollers in the first and second roller-top conveyor belts having salient portions supporting conveyed articles along the carryway and engaging the bearing surface in rolling contact as the belts advance along the carryway in a direction of belt travel;

wherein the rollers in the first conveyor belt in rolling contact with the bearing surface are arranged to rotate about first axes oriented to urge conveyed articles toward the second conveyor belt as the first conveyor belt advances and wherein the rollers in the second conveyor belt in rolling contact with the bearing surface are arranged to rotate about second axes oriented to urge conveyed articles toward the first conveyor belt as the first second conveyor belt advances;

first and second drives coupled to the first and second roller-top conveyor belts to selectively stop the advance of either of the roller-top conveyor belts as the other continues to advance.

11. A conveyor as in claim 10 further comprising sensors sensitive to the orientation of a conveyed article and a controller coupled to the first and second drives to selectively send a stop signal to either of the first and second drives in response to signals from the sensors.

12. A conveyor as in claim 11 wherein a portion of the sensors are arranged in an array having a geometry selected to enable the controller to determine the major axis of a conveyed article and the angular orientation of the major axis relative to the direction of belt travel.

13. A conveyor as in claim 12 wherein the controller sends the stop signal to one of the first and second drives whenever the major axis exceeds a predetermined major-axis value and the angular orientation of the major axis differs from the direction of belt travel by more than a predetermined angle value.

14. A conveyor as in claim 10 wherein the drives stop the conveyor belts for a predetermined period of time.

15. A conveyor as in claim 10 wherein one of the first and second drives speeds up one of the first and second roller-top conveyor belts while the other is stopped.

16. An article-rotating conveyor comprising:

a conveyor arrangement extending from an upstream end to a downstream end and comprising a pair of individually driven conveyor belts disposed side by side across a gap, each conveyor belt including rollers, each roller having a salient portion extending past top and bottom belt surfaces and rotatable on an axis that intersects the gap at a position upstream of the roller, the conveyor arrangement defining a carryway along which articles are conveyed atop the rollers as the belts advance from the upstream end toward the downstream end;

the carryway having an active portion underlain by a bearing surface contacting the rollers extending past the bottom belt surfaces to cause the rollers to rotate as the conveyor belts advance and an inactive portion in which the rollers extending past the bottom belt surfaces are out of contact with a bearing surface;

a controller coupled to the conveyor arrangement to selectively stop the advance of one or the other of the pair of conveyor belts when a conveyed article is in the active portion of the carryway to cause the conveyed article to rotate.

17. A conveyor as in claim 16 further comprising a first sensor disposed proximate the upstream end of conveyor and sending a first signal to the controller indicative of the orientation of an article conveyed along the carryway.

18. A conveyor as in claim 17 wherein the first sensor comprises an array of individual sensors each sending individual first signals to the controller.

19. A conveyor as in claim 17 wherein the controller is capable of stopping one or the other of the first and second conveyor belts in response to the first signal.

20. A conveyor as in claim 19 wherein the controller stops the first or second conveyor belt for a predetermined period of time.

21. A conveyor as in claim 17 wherein the controller is capable of speeding up one of the first and second conveyor belts while the other is stopped.

22. A conveyor as in claim 17 further comprising a second sensor disposed at an upstream position along the carryway sending a second signal to the controller indicative of the presence of an article in position to be sensed by the first sensor.

23. A conveyor as in claim 17 further comprising a third sensor disposed along the carryway proximate the upstream end of the bearing surface to send a third signal to the controller indicative of the presence of a conveyed article at that position along the carryway and wherein the controller selectively sends a stop signal to one of the first and second drives after receipt of the third signal.

24. A conveyor comprising:

first and second individually driven conveyor belts forming belt loops, each conveyor belt extending in width from a first side to a second side and in thickness from an outer surface to an inner surface, wherein the first and second conveyor belts are disposed parallel to each other with the first side of the first conveyor belt adjacent the second side of the second conveyor belt, a portion of the loops defining a carryway along which articles are conveyed along the outer surfaces from an upstream end of the carryway to an opposite downstream end;

the first and second conveyor belts including a plurality of rollers protruding beyond the outer and inner surfaces of the first and second conveyor belts;

a bearing surface underlying the first and second conveyor belts along at least a portion of the carryway, the rollers extending from the inner surfaces of the first and second conveyor belts into rolling contact with the bearing surface to rotate as the first and second conveyor belts advance in a direction of belt travel;

wherein each of the rollers in the first conveyor belt is arranged to rotate about an axis intersecting the first side of the first conveyor belt at a position upstream of the roller and wherein each of the rollers in the second conveyor belt is arranged to rotate about an axis intersecting the second side of the second conveyor belt at a position upstream of the roller;

a controller coupled to one or both of the first and second conveyor belts to selectively stop either of the first and second conveyor belts while the other conveyor belt continues to advance.

25. A conveyor as in claim 24 further comprising sensors sending signals indicative of the orientation of conveyed articles to the controller from which signals the controller decides whether to stop either of the first and second conveyor belts.

26. A conveyor as in claim 25 wherein the sensors are arranged in an array having a geometry selected to enable the controller to determine the major axis of a conveyed article and the angular orientation of the major axis relative to the direction of belt travel from the signals.

27. A conveyor comprising:

a first roller-top conveyor belt arranged to be driven in a direction of belt travel along a carryway;

a second roller-top belt arranged side by side with the first roller-top conveyor belt along the carryway;

a bearing surface underlying the first and second roller-top conveyor belts along at least a portion of the carryway;

each of the first and second roller-top conveyor belts including rollers contacting the bearing surface in the carryway to rotate the rollers as the roller-top conveyor belts are driven in the direction of belt travel;

wherein the rollers on each roller-top conveyor belt are arranged to exert on conveyed articles forces having components directed toward the other roller-top conveyor belt as the rollers are rotated by contact with the bearing surface;

a drive system coupled to the first and second roller-top conveyor belts to selectively stop one of the roller-top conveyor belts while the other advances in the direction of belt travel for a sufficient time to rotate an article being conveyed atop both roller-top belts.

28. A conveyor as in claim 27 wherein the drive system comprises:

a first drive coupled to the first roller-top conveyor belt to start and stop the advance of the first roller-top conveyor belt in the direction of belt travel;

a second drive coupled to the second roller-top conveyor belt to start and stop the advance of the second roller-top conveyor belt in the direction of belt travel;

a controller coupled to the first and second drives to control the starting and stopping of the first and second roller-top conveyor belts.

29. A conveyor as in claim 28 further comprising sensors sending signals to the controller indicative of the size and orientation of articles conveyed on the conveyor.

30. A method for rotating an article comprising:

selecting a first conveyor belt extending in width from a first side to a second side and having rollers that protrude past outer and inner surfaces of the belt and that are arranged to rotate on first axes forming acute angles measured counterclockwise from the first side of the belt;

selecting a second conveyor belt extending in width from a first side to a second side and having rollers that extend past outer and inner surfaces of the belt and that are arranged to rotate on second axes forming acute angles measured clockwise from the second side of the belt;

arranging the first and second conveyor belts side by side with the first side of the first conveyor belt adjacent to the second side of the second conveyor belt;

supporting a portion of the first and second conveyor belts atop an underlying bearing surface contacting the rollers protruding past the bottom surfaces to rotate the rollers as the belts advance;

advancing the first and second conveyor belts in a direction of belt travel;

putting an article atop the rollers protruding past the outer surfaces of the first and second conveyor belts advancing in the direction of belt travel;

stopping one of the first and second conveyor belts from advancing to rotate the article atop the rollers as the other of the belts continues to advance.

31. The method of claim 30 further comprising:

arranging an array of sensors in a position to sense the orientation of the article.

32. The method of claim 30 further comprising:

sensing the orientation of the article atop the rollers.

33. The method of claim 30 further comprising:

determining the length of the major axis of the article and the angular orientation of the major axis relative to the direction of belt travel.

34. The method of claim 33 further comprising:

selecting which one of the first and second conveyor belts to stop depending on the length of the major axis of the article and the angular orientation of the major axis.

35. The method of claim 30 further comprising:

while stopping one of the first and second conveyor belts from advancing, speeding up the other.

* * * * *